(12) United States Patent
Ford et al.

(10) Patent No.: US 7,560,644 B2
(45) Date of Patent: Jul. 14, 2009

(54) PASSIVE FIRE PROTECTION SYSTEM FOR ENERGIZED ELECTRIC UTILITY FACILITIES AND METHOD OF INSTALLATION

(75) Inventors: Jim Ford, Woodridge, IL (US); Lance Slmma, Schaumburg, IL (US)

(73) Assignee: Luse Thermal Technologies, LLC, Aurora, IL (US)

( * ) Notice: Subject to any disclaimer, the term of this patent is extended or adjusted under 35 U.S.C. 154(b) by 0 days.

(21) Appl. No.: 12/313,294

(22) Filed: Nov. 19, 2008

(65) Prior Publication Data

US 2009/0126989 A1    May 21, 2009

Related U.S. Application Data

(60) Provisional application No. 61/003,680, filed on Nov. 19, 2007.

(51) Int. Cl.
*H02G 3/04*    (2006.01)

(52) U.S. Cl. ............... 174/68.1; 174/68.3; 174/135; 174/85; 174/95; 174/48; 174/656; 52/232; 52/3; 138/123; 138/92

(58) Field of Classification Search ........... 174/68.1, 174/68.3, 135, 85, 88 R, 95, 96, 99 R, 481, 174/480, 24, 656; 52/232, 3, 4; 138/123, 138/124, 92, 167; 169/16, 37
See application file for complete search history.

(56) References Cited

U.S. PATENT DOCUMENTS

| | | | | | |
|---|---|---|---|---|---|
| 4,433,732 | A | * | 2/1984 | Licht et al. | 169/48 |
| 4,791,993 | A | * | 12/1988 | Curran | 169/16 |
| 5,750,927 | A | * | 5/1998 | Baltazar | 174/68.3 |
| 5,939,676 | A | * | 8/1999 | Birmingham et al. | 174/656 |
| 7,331,399 | B2 | * | 2/2008 | Multer | 169/16 |
| 7,389,824 | B2 | * | 6/2008 | Jackson | 169/16 |

* cited by examiner

*Primary Examiner*—Dhiru R Patel
(74) *Attorney, Agent, or Firm*—McNair Law Firm, P.A.; Seann P. Lahey

(57) ABSTRACT

A passive fire protection system for a power facility having a fire resistant wrap enclosing cable joints and adjacent power cables; a fire resistant sheet carried between the power cables and the control cables defining a fire barrier to resist fire from the power cables damaging the control cables; a fire resistant wrap on a cable drop section of the control cables so that the cable drop section is protected from burning power cables; a radiant heat shield carried on a bottom side of a hatchway cover leading from the room containing the power cables to deflect heat from passing through the hatchway cover into a floor above the basement; and, a fire penetration seal in each cable penetration opening to resist fire and heat from passing upward into adjacent floors of the power facility.

27 Claims, 11 Drawing Sheets

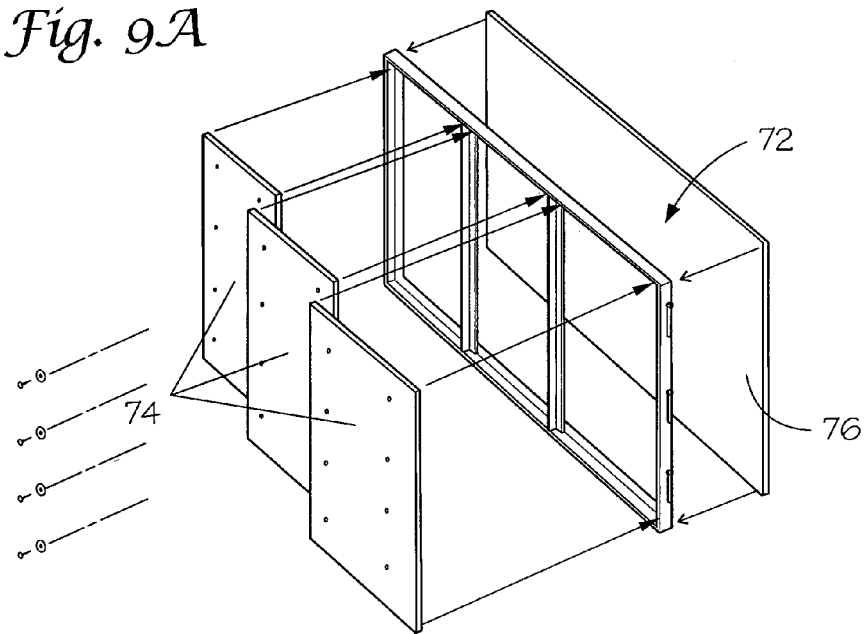
Fig. 9A
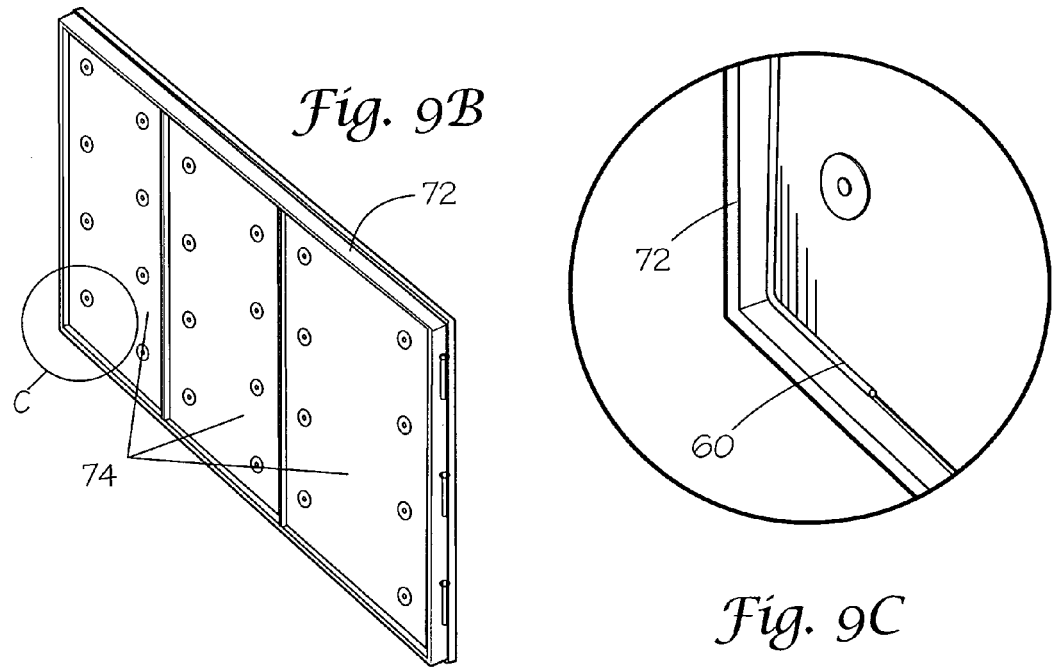
Fig. 9B
Fig. 9C

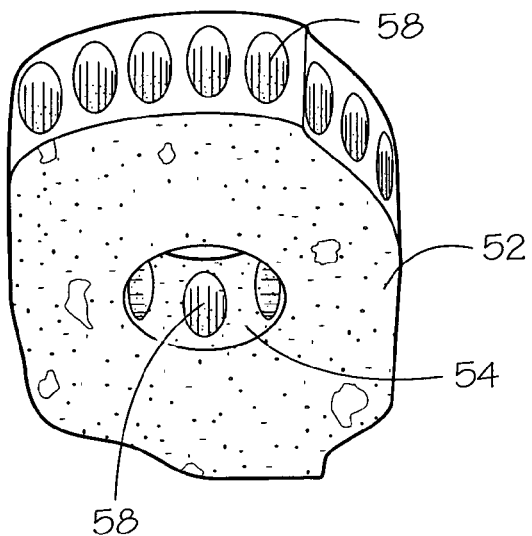
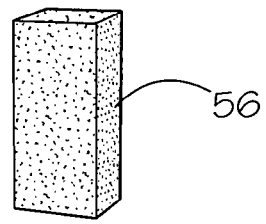
Fig. 11
Fig. 10
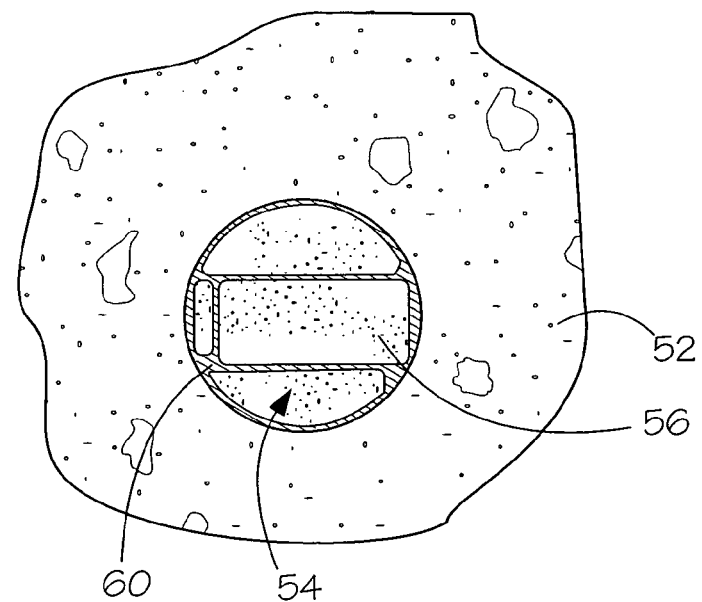
Fig. 12

PASSIVE FIRE PROTECTION SYSTEM FOR ENERGIZED ELECTRIC UTILITY FACILITIES AND METHOD OF INSTALLATION

CROSS REFERENCE TO RELATED APPLICATION

This application claims priority from U.S. Provisional Application filed Nov. 19, 2007 under Application No. 61/003,680.

BACKGROUND OF THE INVENTION

1) Field of the Invention

The present invention relates to fire protection for high-risk facilities such as electrical power plants and electrical sub-stations, and more particularly, to a comprehensive passive fire protection system to prevent fire damage from burning power cables from spreading between adjacent power cables, control cables, equipment and rooms of utility facilities.

2) Description of Related Art

Fire protection for power facilities is a critical component of their construction given the tendency for fires to occur at such facilities. A fire at an electrical sub-station can cause substantial damage to equipment, cause outage time to a service area, and cost millions of dollars to repair if proper fire prevention techniques are not used. Unfortunately, the currently used techniques and materials to prevent such fire damage are inadequate for intended protection, inadequate to protect against the severity and duration of the fire, improperly installed, or are completely unqualified designs that can accelerate the spread of a fire. For example, inspections of electrical sub-station facilities has revealed unqualified or missing fire penetration seals ("firestops") around power and control cables passing between floors. This degrades the fire rating of the floor separating, for example, a switchgear room from a basement where the majority of the power and control cables are routed. Degraded fire barriers can allow passage of fire and smoke through the floor openings, creating problems for the operation of switchgear, or even the total loss of a sub-station. As smoke can travel up to 420 feet per minute, proper containment is essential to effectively combat a fire and maintain operation of the facility. Further, it has been observed that because specific standards mandated for passive fire protection systems have been ignored, combustible materials, such as cardboard and rags, have been used to seal openings between floors, which can have devastating consequences.

The vast majority of fire protection systems are designed to be installed from above the floor. In sub-station basements, "above the floor" typically means inside a switch gear or bus cabinet. This can create a substantial design flaw in the protection depending on the type of floor. For example, when installing an "above the floor" seal in a hollow core concrete floor, typically accomplished with small amounts of mineral wool and caulk jammed around the cable or pipe, there is no protection which extends into the flooring to seal off the large openings formed in the flooring itself. This allows the fire and smoke to spread through the flooring and possibly causing the floor to fail or find an alternative exit into the room above.

Further, effective passive fire protection requires unique designs depending on the type of flooring. Different passive fire protection seal designs are often required for different floor types, including: hollow core floor, 3 inch concrete slab, 6 to 9 inch concrete slab, concrete on metal pan deck, or metal floor. The prior art does not effectively give consideration to adapting qualified passive fire protection designs for many different types of flooring. Because each type of floor has its own design challenges, failure to use a qualified protection method can substantially degrade the fire rating of the floor and eliminate any inherent protection therein.

In addition to maintaining the effective fire rating of the flooring, it is important to anticipate and protect against overheating and explosions of connections between power cables. When a cable joint explodes, fire and molten metal from the cable fault typically knock out adjacent cables, shutting down other power circuits. Further, burning power cables have damaged control cables routed above power cables, degrading ability to operate the sub-station. The prior art and current fire protection techniques fail to properly and adequately address these problems.

Aside from openings in flooring for cabling and the like, a typical sub-station often has a steel hatchway cover between floors. For example, such a hatchway cover is used to close an access way between the basement and the sub-station battery backup power room. It has been observed that heat radiating through a closed steel hatchway cover resulting from a basement fire at a sub-station melted the battery packs in the room above. This resulted in failure of the sub-station backup power. Damage to the facilities backup power system prevented operation of switchgear, leading to a larger power outage. Thus, there is a need to protect such hatchways from radiating heat that may damage equipment in adjacent rooms.

Accordingly, it is an object of the present invention to provide a comprehensive passive fire protection system for high-risk buildings such as power facilities.

It is an object of the present invention to provide fireproof seal designs for closing cable penetration openings that can be efficiently installed from underneath the floor to contain fire and smoke within a compartment.

It is an object of the present invention to provide specific passive fire protection designs for specific types of flooring to maintain the fire rating of the flooring.

It is an object of the present invention to provide a passive fire protection system that includes fire resistant wraps for power cable joints so that an exploding power cable joint has reduced capability of damaging adjacent power cables.

It is an object of the present invention to provide a passive fire protection system that includes a fire barrier between control cables and power cables to protect the control cables from exploding and burning power cables so that operations of the facility can be maintained.

It is an object of the present invention to provide a passive fire protection system that includes radiant heat shielding for hatchways so that radiant heat passing through hatchway covers is prevented from damaging equipment in adjacent rooms.

SUMMARY OF THE INVENTION

The above objectives are accomplished according to the present invention by providing a passive fire protection system for a power facility comprising a series of power cables carried by racks in a basement level of the power facility so that a plurality of power cables are generally aligned in a vertically spaced arrangement above the ground, and wherein the power cables include cable connectors at various points along the power cables to join ends of the power cables; a first fire resistant wrap enclosing the cable connectors and extending outwardly along the power cables a predefined distance to resist fire damage resulting from a failure at the cable connectors; the first fire resistant wrap being carried by power cables on the rack adjacent to the cable connectors both above and below so that fire damage to adjacent power cables resulting from a failure of the cable connectors is resisted; a plurality of control cables carried on the racks above the power cables for operating various equipment of the power facility; a flexible fire resistant sheet carried between the power cables and the control cables defining a fire deflection barrier, wherein the fire resistant sheet is vertically spaced between the power cables and the control cables to create an air gap below the power cables so that direct exposure of the control cables to flames from burning power cable is resisted; the control cables having a cable drop section wherein the control cables extend downwardly from the rack towards the power cables and enter an opening in a wall of the basement, wherein a second fire resistant wrap encloses the cable drop section that extends from the fire resistant sheet to the opening in the wall so that the cable drop section is protected from burning power cables; a hatchway disposed in a ceiling of the basement having a hatchway cover, wherein a radiant heat shield is applied to a bottom side of the hatchway cover exposed to the basement so that heat from a fire in the basement is deflected from passing through the hatchway cover into the floor above the basement; and, a plurality of cable penetration opening disposed in the ceiling of the basement passing the control cables through to the floor above, wherein a fire penetration seal is disposed in each of the cable penetration openings to resist fire and heat from passing upward into adjacent floors of the power facility.

In a further embodiment, the first fire resistant wrap includes a fiberglass layer exposed on a first side of the wrap and a silicone foam layer exposed on a second side of the wrap opposite the first side, wherein the wrap is mounted to the power cables with the first side of the fiberglass layer contacting the power cables and the silicone foam layer facing outward.

In a further embodiment, the flexible fire resistant sheet and the second fire resistant wrap comprises a silica cloth.

In a further embodiment, the silica cloth is wrapped around the cable drop and secured to the cable drop by fire resistant ceramic rope ties so that the ties resist burning off and allowing the silica cloth to unwrap from the cable drop.

In a further embodiment, the system includes a cable tray supporting the control cables, wherein the flexible fire resistant sheet is carried below the cable tray and above the power cables to provide a fire resistant barrier between the control cables and the power cables.

In a further embodiment, the system includes a fire resistant caulk carried around a peripheral edge of the radiant heat shield to eliminate air gaps between the radiant heat shield and the hatchway cover to resist heat transfer through the hatchway cover.

In a further embodiment, the fire penetration seal includes a fire resistant block material carried in the cable penetration opening providing a foundation for sealing off the opening.

In a further embodiment, the fire penetration seal includes a fire resistant caulk carried around the fire resistant blocks to form an airtight seal between the blocks and the ceiling to close off the cable penetration opening.

In a further embodiment, the system includes a fire resistant cable collar mounted to the ceiling around a cable bundle extending through the cable penetration opening, wherein an interior area of the collar receiving the cable bundle is filled with the fire resistant caulk.

In a further embodiment, the system includes one of a metal plate and wire mesh mounted to the ceiling covering at least a portion of the cable penetration opening supporting the fire resistant blocks.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 9A-9C show perspective views of securing radiant heat shields to the hatchway cover of FIG. 8 according to the present invention;

FIG. 10 shows a perspective view of a section of hollow-core concrete flooring;

FIG. 11 shows a perspective view of a fire resistant block according to the present invention;

FIG. 12 shows a cable penetration opening the ceiling of the basement level of FIG. 1 in which fire resistant blocks and caulk have been inserted to form a fire penetration seal according to the present invention;

DETAILED DESCRIPTION OF A PREFERRED EMBODIMENT

With reference to the drawings, the invention will now be described in more detail. A comprehensive approach to passive fire protection for high-risk facilities such as electrical power plants and electrical sub-stations is accomplished according to the present invention by providing a system and method that includes the following: 1) fire penetration seals on all cable penetrations through floors; 2) power cable joint protection; 3) control cable protection; and, 4) hatchway cover protection. Together, these passive protection systems combine to provide effective fire containment and management. Each of these areas is described in further detail herein below.

Figure 1:
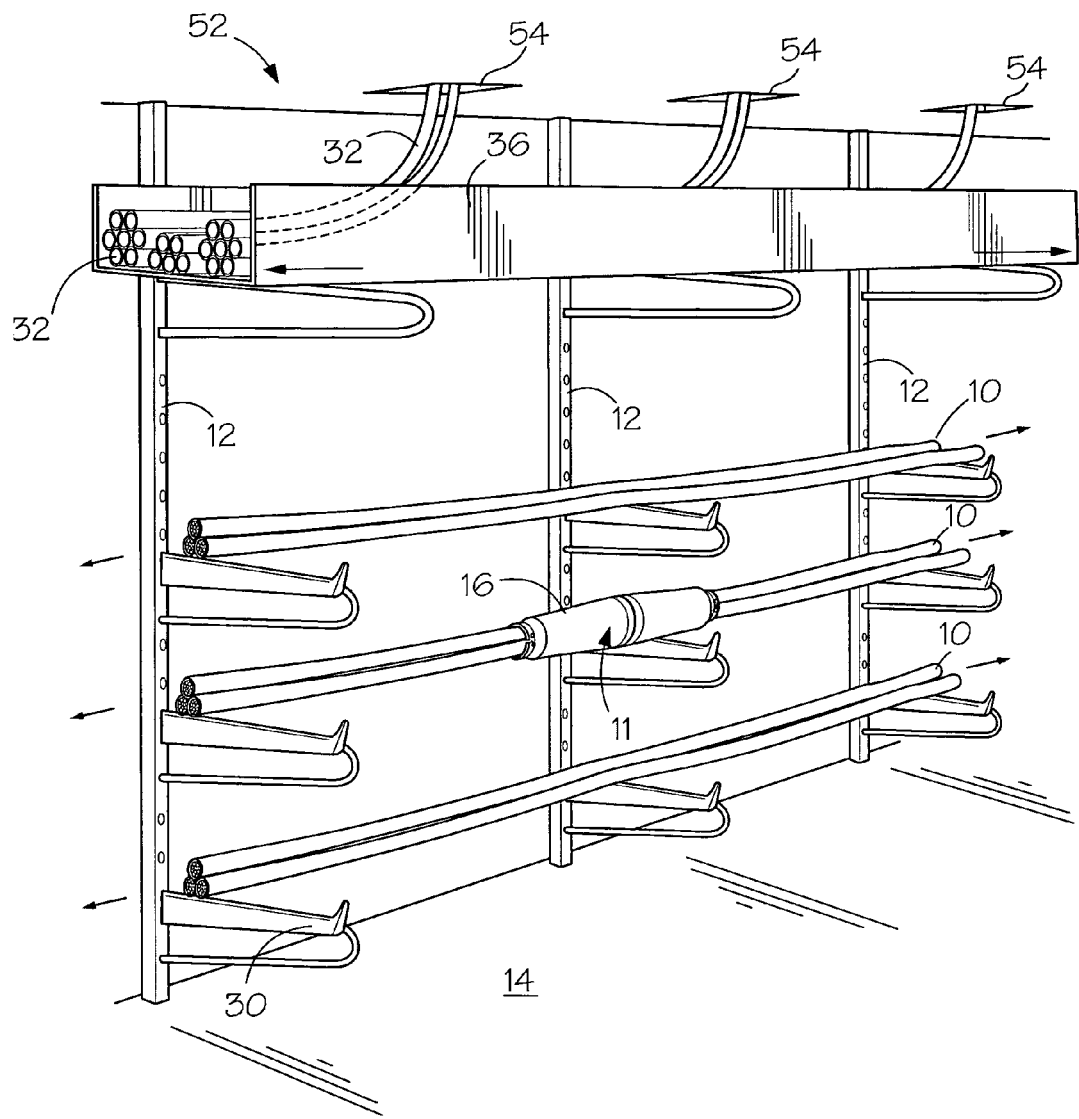
FIG. 1 shows perspective view of a basement level of a power facility with an arrangement of unprotected power cables and control cables carried on a rack.

As part of the comprehensive approach to passive fire protection, it is important to anticipate and protect against overheating and explosions of connections between power cables. When a cable joint, designated generally as 11 (FIG. 1) explodes, fire and molten metal from the cable fault typically knock out adjacent cables, shutting down other power circuits. Referring to FIG. 1, a typical basement level of an electrical sub-station is shown through which a series of power cables 10 are carried by racks 12 so that power cables 10 are generally aligned in a vertically spaced arrangement above the ground 14. Power cables 10 include cable connectors 16 at various points along the power cables to join ends of power cables together.

Figure 2:
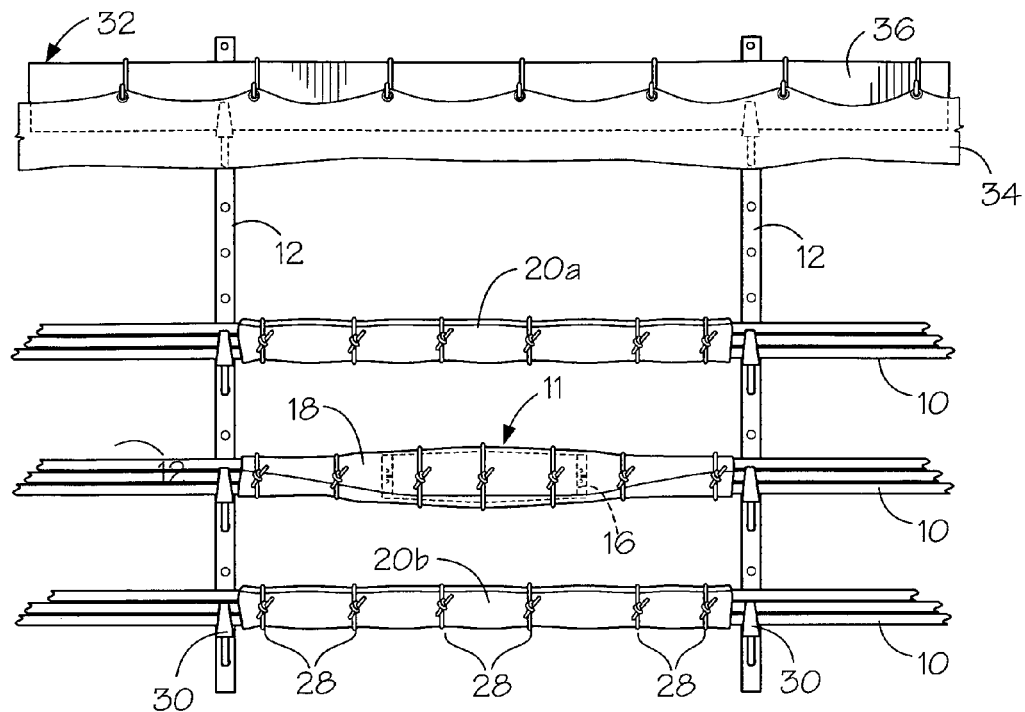
FIG. 2 shows a side elevation view of the rack in the basement level of FIG. 1 carrying the power cables and control cables and including a passive fire protection system according to the present invention.

Referring to FIG. 2, to protect cable joint 11 explosions from damaging adjacent power cables, a first fire resistant wrap 18 is secured to power cables 10 enclosing any cable connectors 16 and extending outwardly along the power cables a predefined distance to resist fire damage resulting from a failure at cable connectors 16. In addition to wrapping a length of fire resistant wrap 18 around all cable connectors 16, fire resistant wrap 18 is also wrapped around all adjacent cables 20a and 20b both above and below any cable joints 11. In the preferred embodiment, first fire resistant wrap 18 is a fire resistant material such as EP3990 or equivalent. The power cable wrap solution involves wrapping any cable joint 11 (plus approximately one foot on each side of the cable connector 16, preferably,) and the adjacent power cables 20a and 20b above and below the cable joint. Upon exposure to fire, materials such as EP3990 fire resistant wrapping forms a char layer (similar to ceramic cell structure) which helps protect the underlying cable. This wrap is not designed to contain an arc blast.

Figure 6:
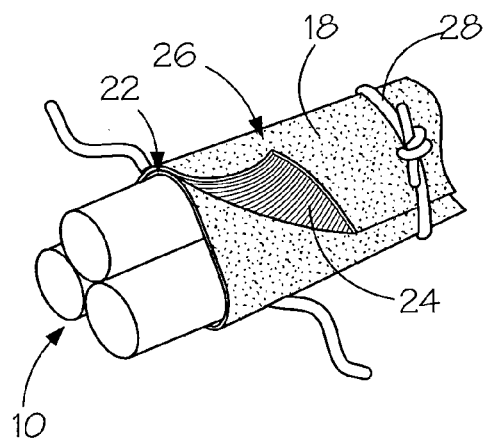
FIG. 6 shows a detailed perspective view of the first fire resistant wrap applied to said power cables according to the present invention.

During the installation process, an electrician checks for joint hot spots in areas requiring coverage and measures the required length of fire resistant wrap 18 to meet the recommended coverage standards. Using a knife or scissors, fire resistant wrap 18 is cut to the required length. Fire resistant wrap 18 is placed around power cable bundle 10. Fire resistant wrap 18 is then positioned for correct placement, making sure wrap 18 extends 12 inches beyond the edge of cable connector 16. Referring to FIG. 6, a top side, designated generally as 22, of cable bundle 10 is covered with two layers of fire resistant wrap 18 creating a 50% overlap. Preferably, fire resistant wrap 18 includes a fiberglass layer 24 exposed on a first side of wrap 18 and a silicone foam layer 26 exposed on a second side of wrap 18 opposite the first side. The fiberglass side 24 of fire resistant wrap 18 is installed contacting power cables 10 so that the silicone foam side 26 of the material faces outward from the power cables. Start the installation with fire resistant wrap 18 positioned at least at a mid point of the power cable bundle. Position fire resistant wrap 18 hand tight around the power cable bundle 10. Line up the wrap so it matches the starting point with other wrap coverage, making sure ends of the wrap coverage line up vertically with previously installed wrap. Referring to FIG. 2, install securing ties 28 every 6 inches and finish each with a knot. Preferably, securing ties 28 may be strips of fire resistant wrap 18 or other fire resistant material such as ceramic rope. Keep the underlying wrap tight while ties 28 are being secured. Ties 28 should be 2 to 4 inches from end of fire resistant wrap 18. Preferably, power cables 10 are lifted from saddle blocks 30 to permit complete coverage of the power cables.

Figure 3:
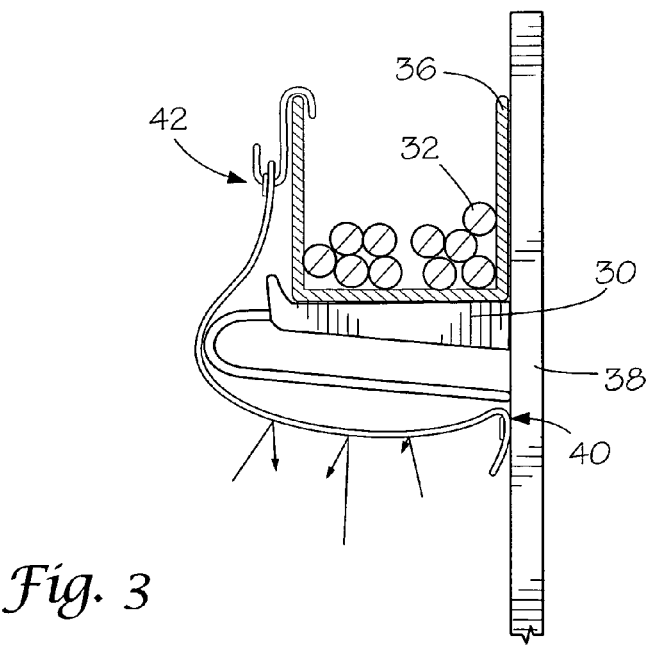
FIG. 3 shows a cross-section view of a cable tray housing a plurality of control cables and a fire resistant sheet disposed below said cable tray according to the present invention.

Referring to FIG. 1, burning power cables have a tendency to also damage control cables 32 which are typically routed directly above power cables 10. Damage to control cables 32 degrade the ability to operate the power sub-station. Referring to FIG. 2, as part of a comprehensive passive fire protection system, the invention utilizes a flexible fire resistant sheet 34, such as a silica cloth, to provide fire protection for control cables 32 carried above power cables 10 by forming a fire deflection barrier there between. The fire resistant sheet 34 is vertically spaced between power cables 10 and control cables 32 to create an air gap that shields control cables 32 from direct flame exposure. In the illustrated embodiment, control cables 32 are routed through cable tray 36 to support control cables 32. Not all control cables 32 are routed through a cable tray 36 and instead may be hung in an open manner hanging from the ceiling above power cables 10. In either case, fire resistant sheet 34 is disposed between control cables 32 and power cables 10 to provide passive fire protection. Referring to FIG. 3, when a cable tray 36 is provided that carries control cables 32, fire resistant sheet 34 is typically secured to wall 38 at a first end, designated generally as 40, and mounted to the outside of cable tray 36 at a second end, designated generally as 42. Various hooks, screws, bolts and the like may be used to secure fire resistant sheet 34 in place below cable tray 36 and above power cables 10.

Figure 4:
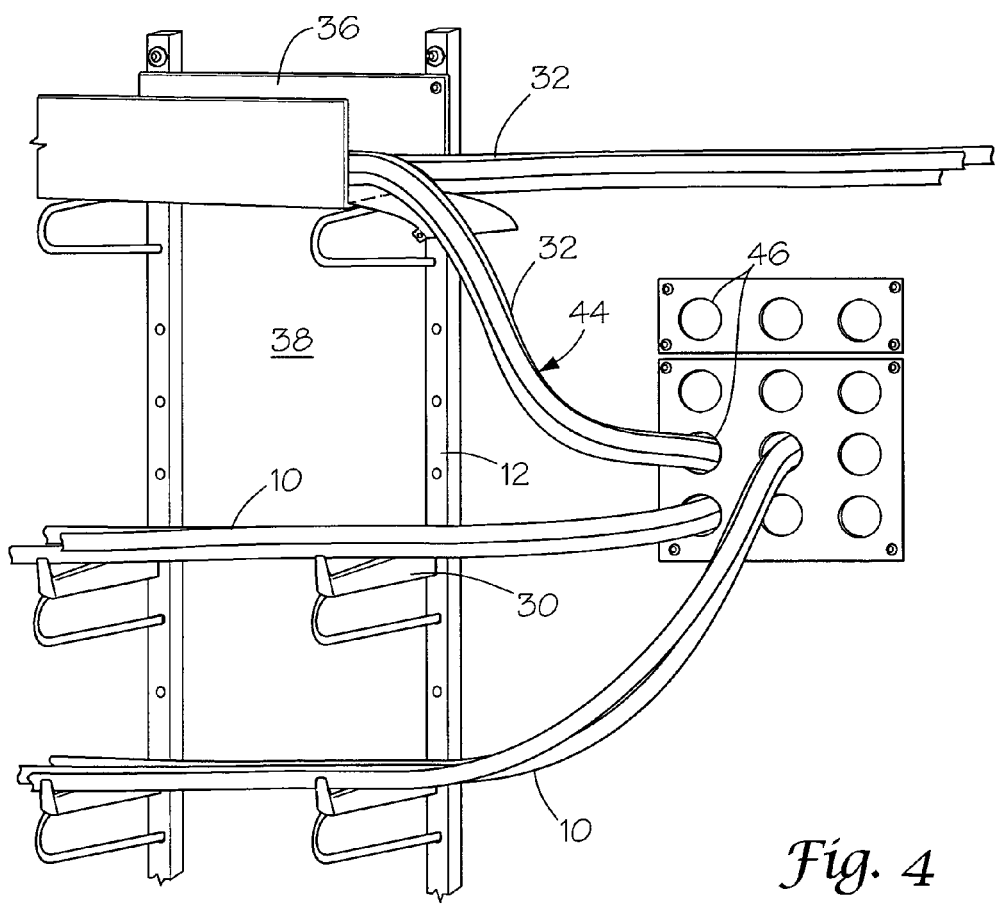
FIG. 4 shows a perspective view of a cable drop from the control cables in an unprotected arrangement.
Figure 5:
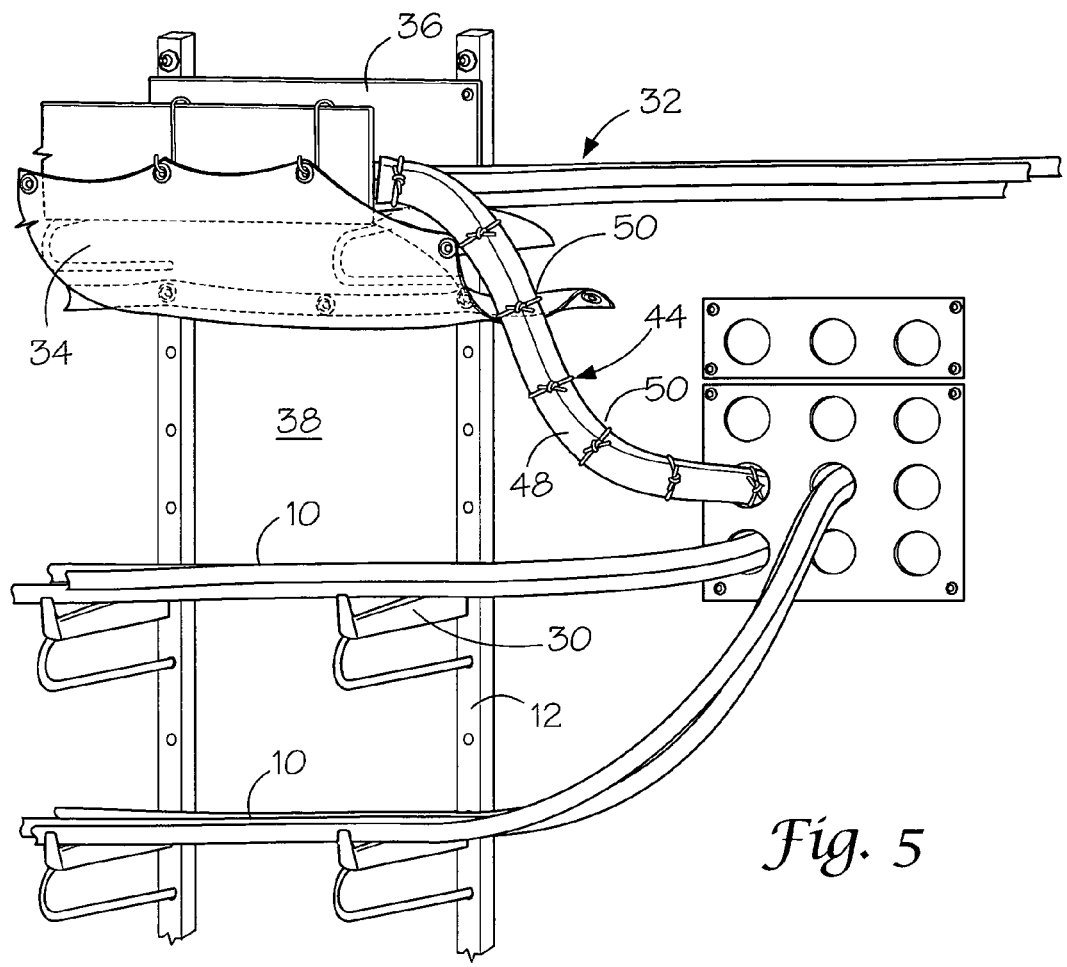
FIG. 5 shows a perspective view of the cable drop arrangement of FIG. 4 with the cable drop including a fire resistant wrap according to the present invention.
Figure 7:
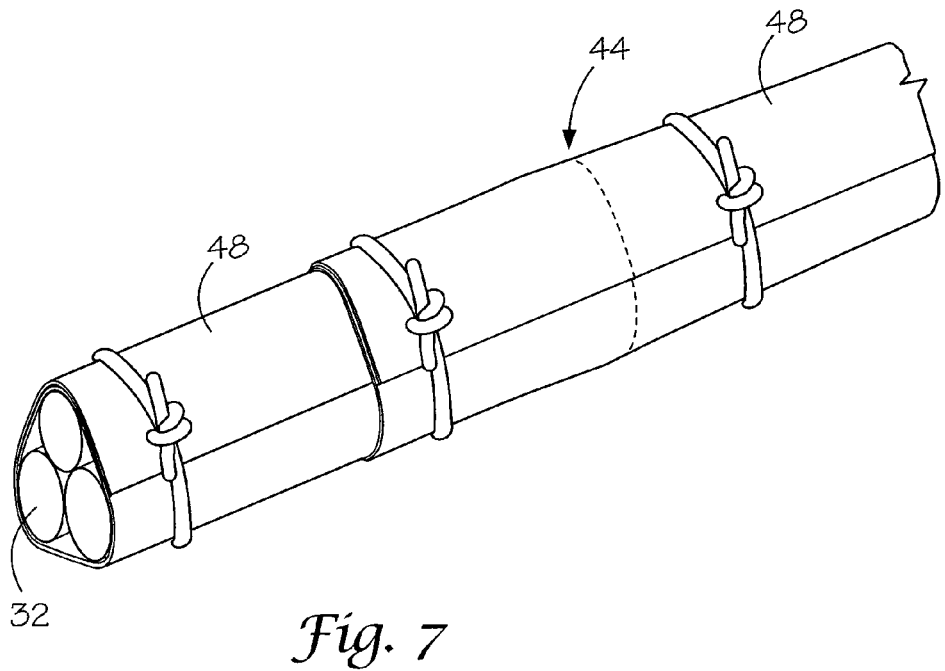
FIG. 7 shows a perspective view of the overlapping arrangement of fire resistant wrap applied to said power cables and cable drop according to the present invention.

Referring to FIGS. 4 and 5, control cables 32 typically includes a cable drop section, designated generally as 44, wherein control cables 32 extend downwardly from an upper portion of rack 12, out of cable tray 36, towards power cables 10 and enter an opening 46 in wall 38. A second fire resistant wrap 48 is provided to enclose cable drop section 44 that extends generally out from under fire resistant sheet 34 to opening 46 in wall 38 so that cable drop section 44 is protected from burning power cables. Preferably, second fire resistant wrap 48 comprises a silica cloth fire barrier as used in fire resistant sheet 34. Preferably, any other cable bundles that extend beyond fire resistant sheet 34 are individually covered in a tube of silica fire barrier cloth. The fire resistant wrap 48 is secured to cable drop sections 44 with ceramic rope ties 50. Ceramic rope ties 50 are installed approximately every 6 inches. Referring to FIG. 7, it is preferred that sections of fire resistant wrap 48 are overlapped approximately 4 inches with each adjacent piece of to ensure solid protection. After tying tight knots, it is helpful to trim off excess ceramic rope with scissors or a knife to avoid entanglement with cables.

Fire penetration seals ("firestops") around power and control cables passing between floors, or for other random opening between floors are critical to successful passive fire protection. Improper installation and unqualified materials are a root cause of most failures to maintain the proper fire rating for the floor. Any openings through the firestop protection seals will lead to premature failure of the entire seal. The present invention provides specific design arrangements for a given flooring type using select materials to provide effective fire penetration seals for all cable penetration opening. Referring to FIG. 1, typically, a plurality of cable penetration opening 54 are disposed in a ceiling 52 of the basement level of the facility containing power cables 10 and passing control cables 32 through to the floor above. In the present invention, a fire penetration seal is disposed in each cable penetration opening, and any random openings, to resist fire and heat from passing upward into adjacent floors of the power facility.

Referring to FIGS. 10-13, an effective fire penetration seal ("firestop") starts by using a fire resistant block material 56 carried in the cable penetration opening 54 to provide a foundation for sealing off the cable penetration opening, for example Hilti FS 657 Fire Block. Similar fire resistant block materials are available from various manufactures. Fire Blocks are used as the primary means to seal most openings in hollow cored concrete, metal or other flooring. Primarily, the focus of the discussion for illustrative purposes will be directed towards hollow cored concrete floor of the type found in most power facilities. The fire blocks 56 have preferred dimensions of 2"×5"×8". In hollow core floors, the fire blocks are installed vertically so that they extend sufficiently through the flooring to seal the hollow passageways 58 within the floor along the penetration route. A first resistant caulk 60, such as for example Hilti FS-One Sealant (Caulk), is used to fill-in all gaps between the fire blocks, the opening, and other components of the effective design for the given flooring system to provide an airtight seal between fire blocks 56 and ceiling 52. Failure to install fire blocks 56 to cover hollow passageways 58 allows heat, fire and smoke to potentially spread throughout the floor, which can lead to a structural collapse of the floor. Accordingly, proper installation is critical to an effective passive fire protection system, and the methods outlined herein will ensure such effective installation.

Figure 14:
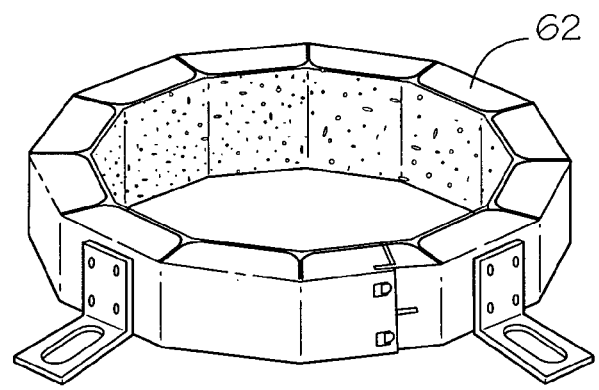
FIG. 14 shows a perspective view of a cable bundle collar for forming a fire penetration seal around cables passing through the ceiling of the basement level according to the present invention.
Figure 15A:
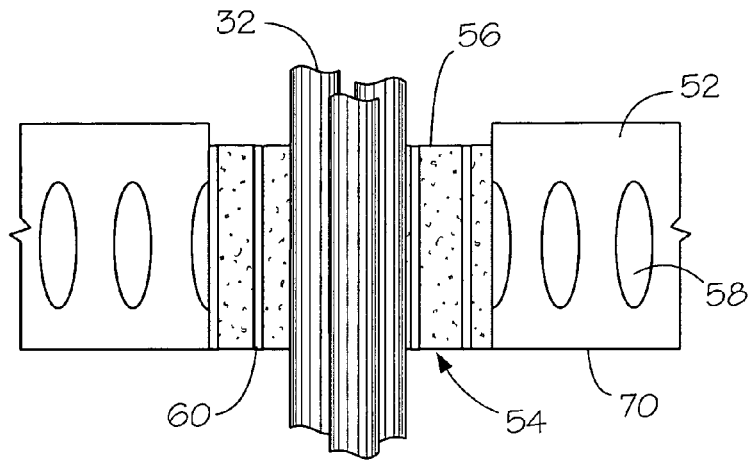
FIGS. 15A-15D show installation of a fire penetration seal around a cable bundle according to the present invention.
Figure 15B:
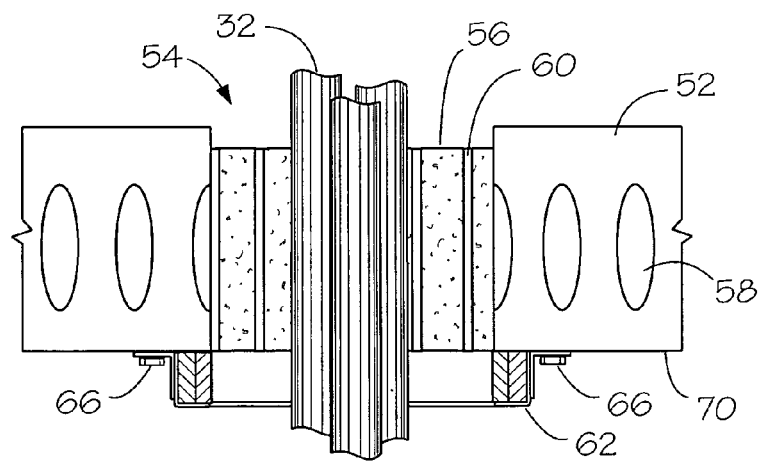
Figure 15C:
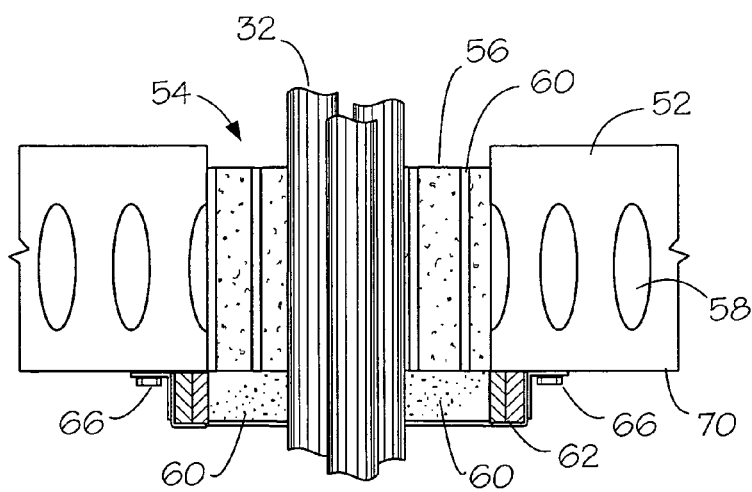
Figure 15D:
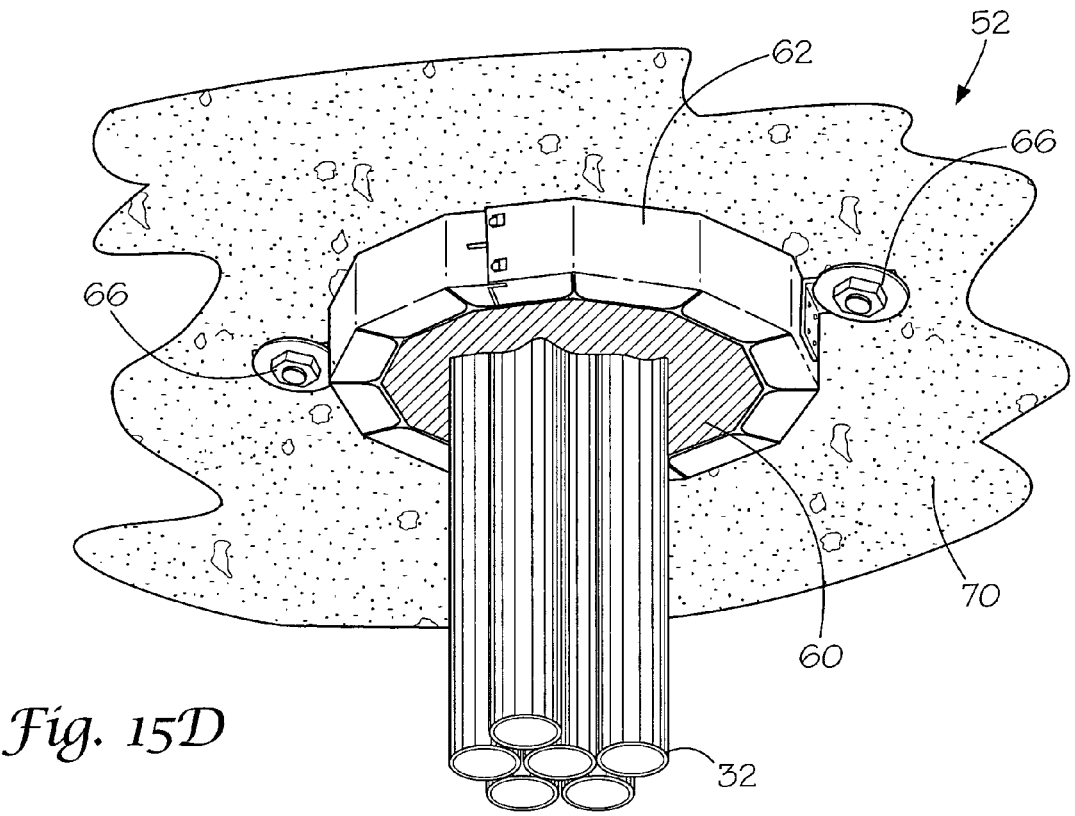
Figure 16:
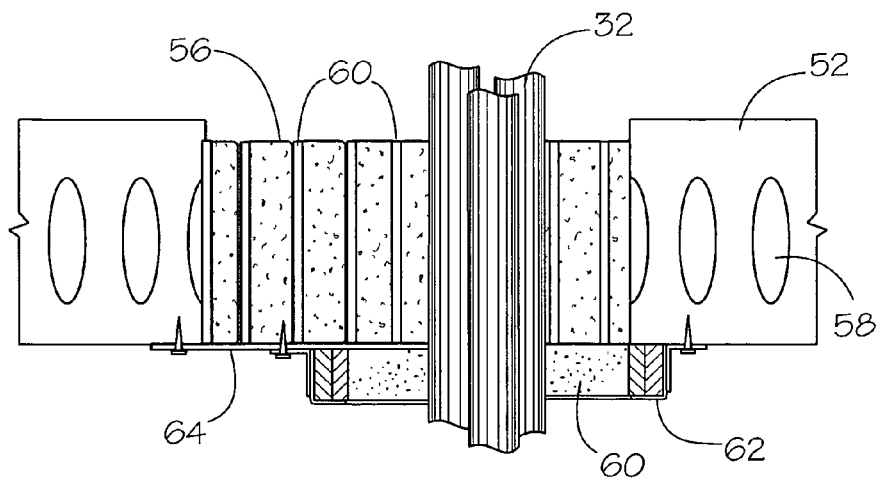
FIG. 16 shows a cross-section view of an alternative arrangement of fire penetration seal for a cable penetration opening according to the present invention; and, FIGS. 17A-17C show installation of a alternative arrangement of a fire penetration seal for a large cable penetration opening according to the present invention.

Referring to FIGS. 14-16, in addition to the fire blocks, an effective fire penetration seal may also call for a fire resistant cable collar 62 mounted to ceiling 52 around any cable bundles. Preferably fire resistant cable collar 62 is, for example, the Hilti CP643N Collar, or similar device. Referring to FIG. 16, sheet metal 64 may be used to cover spare openings and large openings where a fire resistant cable collar 62 is part of the qualified design but does not fully cover the opening 54. Preferably, sheet metal 64 is of 26 gauge minimum thickness for extended fire protection. Preferably, concrete screws 66 are used to fasten the collars and sheet metal plates to the underside of hollow concrete flooring 52. For metal flooring, other screw types well known to those skilled in the art may be more appropriate. Further, it is preferred that galvanized washers having a minimum ¾" diameter be used with the collars and sheet metal plates. Also, referring to FIGS. 17A-17C, 2"×2" stainless steel wire mesh 68 is used to support and cover fire blocks installation on the underside of the ceiling 52, particularly in areas larger than 4½" (distance from penetrant to opening). Stainless steel fasteners and washers are preferably used to secure the wire mesh to the flooring.

Most older firestop systems in the prior art are installed from above the floor. The present invention uses entirely new techniques and materials to install reliable fire penetration seals from underneath the floor. Referring to FIG. 10, hollow-core floor planks have holes 58 through the center of the concrete running horizontally through the length of the floor. Thus, a problem sealing hollow core floors becomes immediately apparent: a continuous round hole not only exists at the top and bottom of the floor as a cable penetration option, but through the center of the entire floor as well. This would allow any fire or smoke to spread through the flooring until it found another exit, or can even cause the floor to fail. Accordingly, for hollow-core floors, it is critical that the fire blocks be inserted with the 8" length running vertically through the floor to cover the openings within the floor.

Figure 8:
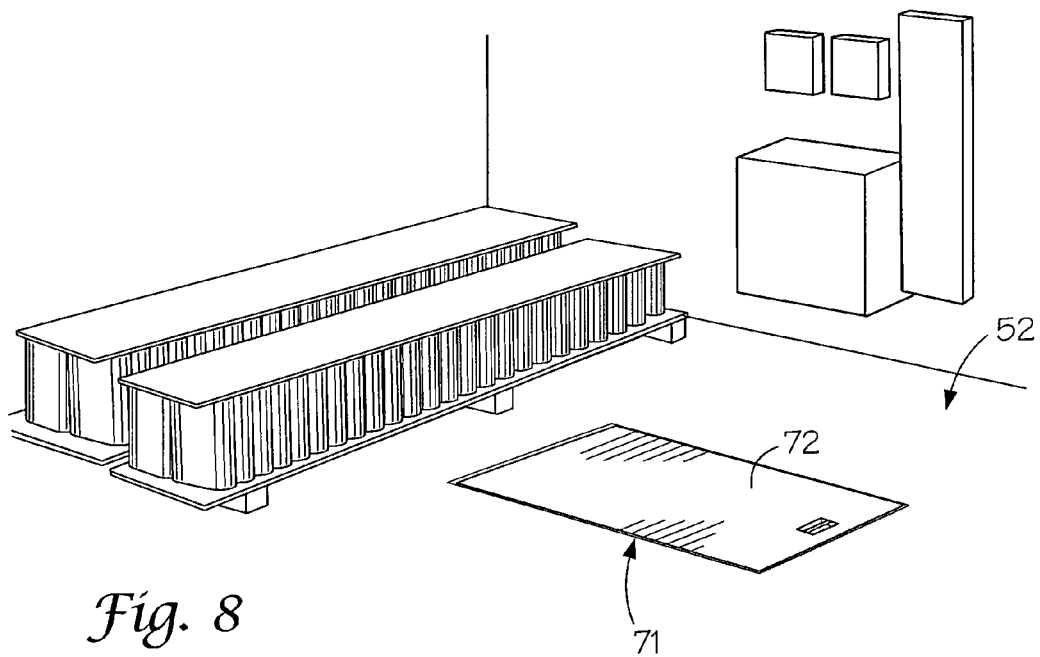
FIG. 8 shows a perspective view of a batter backup room above the basement level in FIG. 1.
Figure 13:
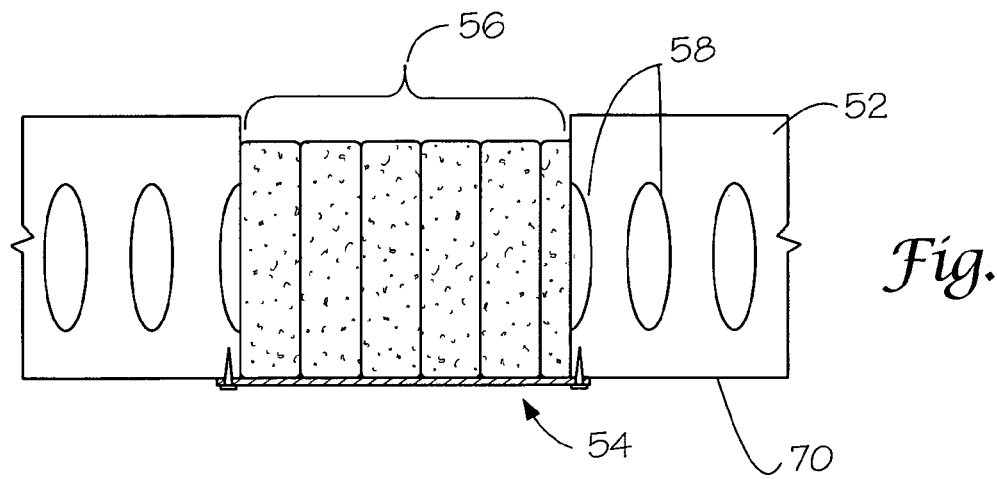
FIG. 13 shows a side cross-section view of a cable penetration opening in a hollow-core concrete floor having a fire penetration seal according to the present invention.

Referring to FIG. 8, some openings may have already been sealed from above with an unknown type and depth of sealant material. If the material is red in color, it may be fire caulk or Hilti Fire Foam. As a general rule, do not remove red colored materials sealing the top of openings. As the present invention installs from beneath the floor, there is no need to disturb the prior seal unless it interferes with the new installation of fire blocks 56 into ceiling 52. Referring to FIG. 13, fire blocks 56 are inserted into the hollow-core floor openings to an 8 inch depth from the surface 70 of ceiling 52. Paper damming material, rags, or urethane foam may have previously been placed in cable penetration opening but are not qualified firestops as they are combustible materials. Any combustible materials need to be removed during an retro-fit application of fire blocks 56 according to the present invention.

Next, selection of the appropriate fire penetration seal design is required to install a qualified seal for a given floor type and opening. To accomplish this in the field, it is preferred that a qualified installation technician examine the opening requiring a firestop and compare the opening to a field manual illustrating a comparable opening and a corresponding appropriate installation setup. Accordingly, the installer will determine, depending on floor type, how the fire blocks are to be positioned, whether a cable collar 62 is required, as well as other considerations such as wire mesh 68 and steel plating 64.

After evaluation and preparation of the opening 54, the new fire penetration seal installation sequence can begin. A common installation in a hollow-core concrete flooring generally involves fire blocks installed from ceiling side 52 so the 8 inch depth of the block 56 penetrates the floor and seals horizontal passageways 58. The fire blocks 56 are installed flush with surface 70, see FIGS. 13 and 15A-15C, and trimmed to friction fit around cables and fill the opening as much as possible. Referring to FIG. 12, fire resistant caulk 60 is then injected into any and all void areas between blocks and/or other openings. Caulk 60 should be installed into voids and gaps to the maximum extent possible to provide a solid, consistent, and durable seal to the opening. Next, a skim coat of caulk is applied to the face of the fire blocks, as best shown in FIG. 17B. The skim coat of fire resistant caulk 60 is preferably troweled into place, which increases adhesion of the caulk to fire blocks 56, cables 32 and the side of opening 54.

Referring to FIGS. 15A-16, for cable collar 62 installation, after fire blocks 56 and fire resistant caulk 60 have been installed into cable penetration opening 54, cable collar 62 is attached to the underside 70 of ceiling 52 around the cables. In the illustrative example, concrete screws 66 attach clips on the cable collar to surface 70. Approved sizes of fasteners and washers include ³⁄₁₆×1¼ concrete screw with ¾" washer and ¼×1¼ concrete screw with ¾" washer. Larger size washers are also acceptable. The required quantity of clips is typically supplied with each cable collar and is based upon the size of collar. For example, a 2" collar needs 2 fasteners, and a 3" collar needs 3 fasteners, and so on. Once mounted, the inside of cable collar 62 is filled with fire resistant caulk 60. It is also important to apply caulk into any remaining gaps between hollow-core floor planks, when the gap intersects the cable penetration opening being sealed. Where cable collar 62 does not sufficiently cover an opening that requires a cable collar, sheet metal 64 is used to cover any extended opening beyond the diameter of cable collar 52. Sheet metal 64 is secured using ¾" minimum diameter washers and concrete screws for hollow-core concrete flooring. Referring to FIG. 16, sheet metal 64 covers fire blocks 56 and fire resistant caulk 60 that would be installed first.

Figure 17A:
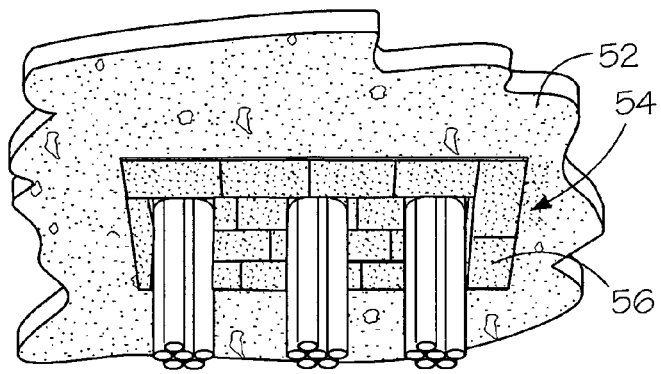
Figure 17B:
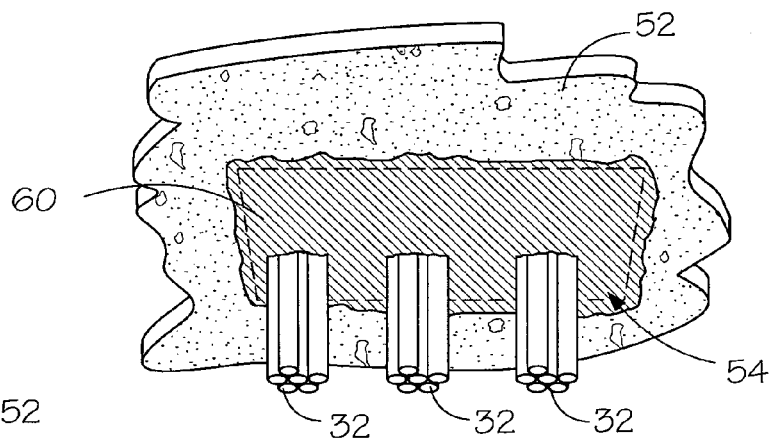
Figure 17C:
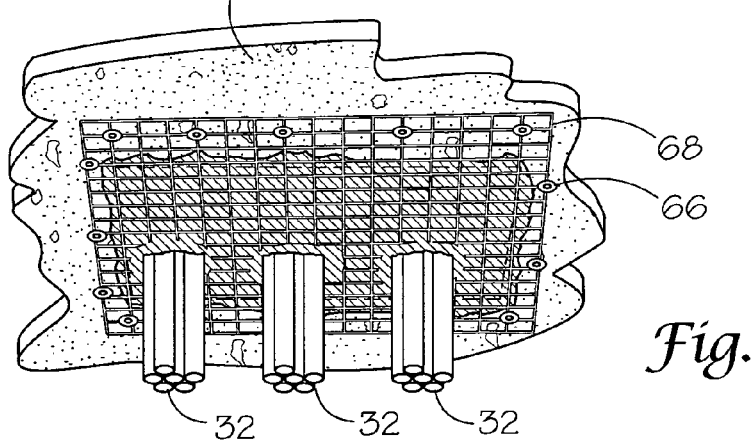

Referring to FIGS. 17A-17C, flooring in power facilities such as an electrical sub-station often have numerous spare or "blank" openings. To seal these blanks in a hollow-core concrete floor, the general procedure involves 1) friction fitting fire blocks 56 into the open areas (8" depth of fire block extending vertically through floor); 2) Caulking the gaps and underside of fire blocks 56 with fire resistant caulk; and, 3)

Installing sheet metal plate 64 or wire mesh 68 over the bottom side of the opening to support the fire blocks and caulking.

Proper installation technique of fire blocks 56 is critical to an effective seal as it forms the foundation of the entire process. The fire blocks should be cut to accurately follow the contour of round openings and penetrants (cables). A knife with a serrated edge works best for cutting typical fire blocks. It is preferable that the fire blocks are staggered so that joints do not line up between fire blocks. Apply fire resistant caulk 60 into all gaps. Install as much caulk as possible into all gaps. As a general rule, the bigger the gap, the deeper the caulk needs to be installed. Accurate cutting is necessary to provide a good seal with minimal caulk as the majority of fire protection comes from the fire blocks. The fire blocks are wedged into place in a friction fit arrangement in the opening. The fire blocks should be installed so they are flush with the bottom of the opening. Trim, cut and fit the fire blocks as close to the contour of the opening and cables as much as possible. Installing fire blocks around penetrants is the most difficult aspect of the seal design. The full 8 inch length of fire blocks 56 has to be placed within the hollow-core floor. Installation may become difficult around the perimeter of opening 54 where a fire block can get caught by the top of the hollow opening. Larger pieces of fire blocks are easier to push into position, compared to smaller pieces. It is preferred to work from one side of the opening to the other. Place the small pieces before the big pieces. It is better to trim and cut a big piece than to install multiple small pieces. Keep gaps as small as possible. Correct fire block installation calls for joints to be staggered, so cut the block in half when installing the second course. For non-hollow core floors, the fire blocks may be installed with the 8 inch depth positioned horizontally so that the 5 inch depth penetrates the floor. Hollow core floors require fire blocks to be installed with the 8 inch depth extending through the floor. After the fire blocks have been placed in opening, install fire resistant caulk into all gaps. The target install will have all cables, opening, and fire blocks encapsulated by caulk. This provides best fire and smoke seal. Caulking of the fire blocks is a necessary step to provide the best seal possible. Install fire resistant caulk into gaps in cables, between cables, between fire blocks and into any voids in the seal assembly. The depth of caulk is not specified, but it is preferred to install caulk to the maximum extent possible. Preferably, the target depth of caulk is at least 1½ inches. Additionally, when cable bundles are wrapped in electrical tape, it is preferred to puncture the tape at a level adjacent to the bottom of the opening and inject the caulk into the area underneath the tape.

For large extended opening, once the fire blocks 56 are installed and sealed with caulk 60, it is preferred to install stainless steel wire mesh 68. During installation, it is preferred that fasteners supporting the wire mesh be spaced a maximum of 8 inches apart. More specifically, annular spaces larger than 4½ inch need to be covered with 2×2 wire mesh. This can occur between cables or at edge of openings. Extend the stainless steel mesh across the bottom of the floor a minimum of 3 inches, preferably. To support the wire mesh, it is preferred to use stainless steel fasteners and washers.

As shown in FIG. 8, a battery backup room may be located over the basement level containing power cables 10 as shown in FIG. 1. Hatchway 71 in floor 52 provides access to the power cables and control cables in the room below. Referring to FIGS. 9A-9C, as a further aspect to the comprehensive passive fire protection system, all hatchway covers 72 between floors are fitted with at least one radiant energy shield 74 to the bottom side 76 of hatchway cover 72. This will help deflect heat that would otherwise radiate through the hatchway and damage equipment. Further, it is preferred that a fire resistant caulk 60 be carried around a peripheral edge of each radiant heat shield 74 to eliminate air gaps between the radiant heat shield and hatchway cover 72 to resist heat transfer through hatchway cover 72.

While a preferred embodiment of the invention has been described using specific terms, such description is for illustrative purposes only, and it is to be understood that changes and variations may be made without departing from the spirit or scope of the following claims.

What is claimed is:

1. A passive fire protection system for a power facility comprising:
   a series of power cables carried by vertically arranged racks in a basement level of the power facility, wherein cable connectors are included at various points along said power cables to join distal ends of said power cables;
   a first fire resistant wrap enclosing said cable connectors and extending outwardly along said power cables a predefined distance to resist fire damage resulting from a fire at said cable connectors;
   said first fire resistant wrap being carried by said power cables on said racks adjacent to said cable connectors both above and below to prevent fire damage to said power cables resulting from said fire at said cable connectors;
   a plurality of control cables carried on said racks above said power cables for operating various equipment of the power facility;
   a flexible fire resistant sheet carried between said power cables and said control cables defining a fire deflection barrier, wherein said fire resistant sheet is spaced between said power cables and said control cables creating an air gap to deflect said fire and prevent direct exposure of said control cables to said fire to prevent burning said control cables from said fire;
   said control cables having a cable drop section extending downwardly from one of said racks beyond said flexible fire resistant sheet and entering a wall opening of said basement, wherein a second fire resistant wrap encloses said cable drop section that extends from said fire resistant sheet to said wall opening so that said cable drop section is protected from said fire;
   a hatchway opening disposed in a ceiling of said basement having a hatchway cover, wherein a radiant heat shield is applied to a bottom side of said hatchway cover exposed to said basement so that heat from said fire in said basement is deflected from passing through said hatchway cover into a room above said basement; and,
   a plurality of cable penetration openings disposed in said ceiling of said basement passing said control cables through to the room above, wherein a fire penetration seal is disposed in each of said cable penetration openings to resist said fire and prevent heat from passing upward into said room of the power facility.

2. The system of claim 1 wherein said first fire resistant wrap includes a fiberglass layer exposed on a first side of said first fire resistant wrap and a silicone foam layer exposed on a second side of said first fire resistant wrap opposite said first side, wherein said first fire resistant wrap is mounted to said power cables with said first side of said fiberglass layer contacting said power cables and said silicone foam layer facing outward.

3. The system of claim 1 wherein said flexible fire resistant sheet and said second fire resistant wrap comprises a silica cloth.

4. The system of claim 3 wherein said silica cloth is wrapped around said cable drop section and secured to said cable drop section by a fire resistant ceramic rope tie so that said tie resists burning off and allowing said silica cloth to unwrap from said cable drop section.

5. The system of claim 1 including a cable tray supporting said control cables, wherein said flexible fire resistant sheet is carried below said cable tray and above said power cables to provide a fire resistant barrier between said control cables and said power cables to prevent damage to said control cables from said fire.

6. The system of claim 1 including a fire resistant caulk carried around a peripheral edge of said radiant heat shield to eliminate peripheral air gaps between said radiant heat shield and said hatchway cover to resist heat transfer through said hatchway cover.

7. The system of claim 1 wherein said fire penetration seal includes a fire resistant block material carried in one of said cable penetration openings providing a foundation for sealing off said cable penetration openings in said ceiling.

8. The system of claim 7 wherein said fire penetration seal includes a fire resistant caulk carried around said fire resistant block to form an airtight seal between said block and said ceiling to close off one of said cable penetration openings.

9. The system of claim 8 including a fire resistant cable collar mounted to said ceiling around at least one of said power cables and said control cables extending through said cable penetration openings, wherein an interior area of said collar receiving at least one of said power cables and said control cables is filled with said fire resistant caulk.

10. The system of claim 8 including one of a metal plate and wire mesh mounted to said ceiling covering at least a portion of one of said cable penetration openings supporting said fire resistant block.

11. A passive fire protection system for a power facility having a basement level with a plurality of power cables and control cables stacked on a series of racks, said power cables having cable connectors at various points along said power cables to join distal ends of said power cables, and a plurality of cable penetration openings in a ceiling of said basement, and a hatchway opening in the ceiling of said basement having a hatchway cover, said passive fire protection system comprising:
a first fire resistant wrap enclosing said cable connectors and extending outwardly along said power cables a predefined distance to resist fire damage resulting from a fire at said cable connectors;
said first fire resistant wrap enclosing said power cables generally adjacent said cable connectors to prevent fire damage to said power cables resulting from said fire;
a fire resistant sheet carried between said power cables and said control cables defining a fire barrier and to prevent damage to said control cables from said fire at said cable connectors;
a second fire resistant wrap applied to a cable drop section of said control cables that extends generally from said racks beyond said fire resistant sheet to an end portion of said cable drop section where said control cables enter a wall opening of said basement to prevent damage to said cable drop section from said fire;
a radiant heat shield applied to a bottom side of said hatchway cover exposed to said basement so that heat from said fire in said basement is deflected from passing through said hatchway cover into a room above said basement; and,
a fire penetration seal disposed in each of said cable penetration openings to resist said fire and prevent heat from passing upward into said room of the power facility.

12. The system of claim 11 wherein said first fire resistant wrap includes a fiberglass layer exposed on a first side of said first fire resistant wrap and a silicone foam layer exposed on a second side of said first fire resistant wrap opposite said first side, wherein said first fire resistant wrap is mounted to said power cables with said first side of said fiberglass layer contacting said power cables and said silicone foam layer facing outward.

13. The system of claim 11 wherein said fire resistant sheet and said second fire resistant wrap comprises a silica cloth.

14. The system of claim 13 wherein said silica cloth is wrapped around said cable drop section and secured to said cable drop section by a fire resistant ceramic rope tie so that said tie resists burning off and allowing said silica cloth to unwrap from said cable drop section.

15. The system of claim 11 including a cable tray supporting said control cables, wherein said fire resistant sheet is carried below said cable tray and above said power cables to provide a fire resistant barrier between said control cables and said power cables to prevent damage to said control cables from said fire.

16. The system of claim 11 including a fire resistant caulk carried around a peripheral edge of said radiant heat shield to eliminate peripheral air gaps between said radiant heat shield and said hatchway cover to resist heat transfer through said hatchway cover.

17. The system of claim 11 wherein said fire penetration seal includes a fire resistant block material carried in one of said cable penetration openings providing a foundation for sealing off one of said cable penetration openings in said ceiling, and a fire resistant caulk carried around said fire resistant block to form an airtight seal between said block and said ceiling to close off one of said cable penetration openings.

18. The system of claim 17 including a fire resistant cable collar mounted to said ceiling around at least one of said power cables and said control cables extending through one of said cable penetration openings, wherein an interior area of said collar receiving said at least one of said power cables and said control cables is filled with said fire resistant caulk.

19. The system of claim 17 including one of a metal plate and wire mesh mounted to said ceiling covering at least a portion of one of said cable penetration openings for supporting said fire resistant block.

20. A method of providing passive fire protection for a power facility having a basement level with a plurality of power cables and control cables carried on racks, said power cables having cable connectors at various points along said power cables to join distal ends of said power cables, a plurality of cable penetration openings in a ceiling of said basement, and a hatchway in the ceiling of said basement having a hatchway cover, said method of providing passive fire protection comprising the steps of:
wrapping a first fire resistant wrap around said cable connectors to enclose said cable connectors and extending the wrap outwardly along said power cables a predefined distance to resist fire damage resulting from a fire at said cable connectors;

wrapping said first fire resistant wrap around said power cables above and below said cable connectors to prevent fire damage to said power cables resulting from said fire at said cable connectors;

mounting a fire resistant sheet between said power cables and said control cables providing a fire barrier to resist said fire from damaging said control cables;

wrapping a second fire resistant wrap around a cable drop section of said control cables that extends beyond said fire resistant sheet to an end portion of said cable drop section where said control cables enters a wall opening of said basement so that said cable drop section is protected from said fire;

mounting a radiant heat shield to a bottom side of said hatchway cover exposed to said basement so that heat from said fire in said basement is deflected from passing through said hatchway cover into a room above said basement; and, installing a fire penetration seal in each of said cable penetration openings in said ceiling to resist said fire and prevent heat from exiting said basement.

21. The method of claim 20 including the step of providing said first fire resistant wrap having a fiberglass layer exposed on a first side of said first fire resistant wrap and a silicone foam layer exposed on a second side of said first fire resistant wrap opposite said first side, and wrapping said first fire resistant wrap around said power cables with said first side of said fiberglass layer contacting said power cables and said silicone foam layer facing outward.

22. The method of claim 20 including the step of tying a fire resistant ceramic rope tie around said second fire resistant wrap on said cable drop section so that said tie resist resists burning off to prevent said second fire resistant wrap from unwrapping from said cable drop section.

23. The method of claim 20 including the step of caulking around a peripheral edge of said radiant heat shield with a fire resistant caulk to eliminate peripheral air gaps between said radiant heat shield and said hatchway cover to resist heat transfer through said hatchway cover.

24. The method of claim 20 wherein installing said fire penetration seal includes the step of inserting a fire resistant block material into at least one of said cable penetration openings to provide a foundation for sealing off one of said cable penetration openings.

25. The method of claim 24 wherein installing said fire penetration seal includes the step of caulking around said fire resistant block with a fire resistant caulk to form an airtight seal between said block and said ceiling to close off one of said cable penetration openings.

26. The method of claim 25 wherein installing said fire penetration seal includes the step of mounting a fire resistant cable collar to said ceiling around at least one of said power cables and said control cables extending through one of said cable penetration openings, and filling an interior area of said collar receiving at least one of said power cables and said control cables with said fire resistant caulk.

27. The method of claim 26 wherein installing said fire penetration seal includes the step of mounting one of a metal plate and wire mesh to said ceiling covering at least a portion of one of said cable penetration openings for supporting said fire resistant block.

* * * * *